United States Patent Office 3,299,063
Patented Jan. 17, 1967

3,299,063
DERIVATIVES OF PYRAZINE
Edward J. Cragoe, Jr., Lansdale, and James H. Jones, Blue Bell, Pa., assignors to Merck & Co., Inc., Rahway, N.J., a corporation of New Jersey
No Drawing. Filed Oct. 4, 1965, Ser. No. 492,842
10 Claims. (Cl. 260—250)

This invention is concerned with novel 2-(3-amino-6-halopyrazinamidino)-2-imidazoline compounds as well as novel methods for preparing these products.

The compounds of this invention can be illustrated by the structural formula

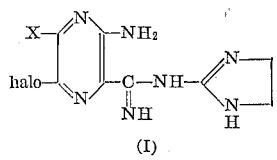

(I)

wherein X is selected from the group consisting of (1) hydrogen, (2) chloro, (3) bromo, (4) lower alkyl, (5) mononuclear aryl-lower alkyl, (6) lower alkoxy, (7) mononuclear aryl-lower alkoxy, (8) lower alkylthio, (9) mononuclear aryl-lower alkylthio, (10) mononuclear aryl (especially phenyl, alkyl-substituted phenyl or halo-substituted phenyl) or (11) amino having the structure $R^1R^2N-$ wherein $R^1$ and $R^2$ are the same or different and each is selected from the group consisting of (a) hydrogen, (b) lower alkoxy, (c) mononuclear aryl (especially phenyl, alkyl-substituted phenyl or halo-substituted phenyl), (d) lower alkyl, (e) lower alicyclic, (f) substituted lower alkyl (wherein the substituent groups are halo, hydroxy, alkoxy, alicyclic, mononuclear aryl, especially phenyl, lower alkyl-substituted aryl, halo-substituted aryl, di-lower alkyl amino, heterocyclic especially mononuclear heterocyclic such as furyl, pyridyl and the like) or (g) $R^1R^2N-$ can have the structure

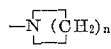

wherein $n$ is 4, 5 or 6; and wherein the 6-position halo substituent is selected from chloro and bromo.

The products of this invention are advantageously prepared by the reaction of a 3-amino-5-X-6-haloprazinonitrile (II) (wherein X and halo have the meaning assigned above) with 2-amino-2-imadazoline (III).

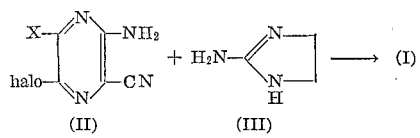

The reaction is facilitated by employing a solvent such as a lower alkanol and by moderate heating of the reaction mixture advantageously at the reflux temperature of the solvent employed.

Alternatively the products of this invention can be prepared by the reaction of the hydrochloride salt of an alkyl 3-amino-5-X-6-halopyrazinimidate (IV) or an alkyl 3-amino-5-X-6-halopyrazinthioimidate (V).

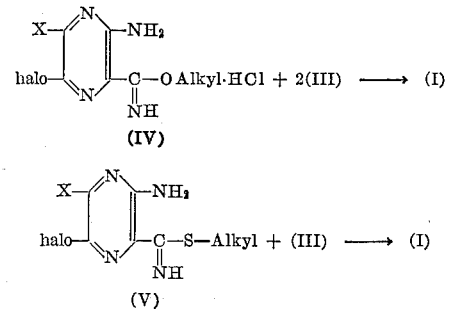

The reaction is conveniently conducted in a solvent such as a lower alkanol and can be conducted at ambient temperatures, although it is sometimes advantageous to employ elevated temperatures, such as at the reflux temperature of the solvent.

It is advantageous to generate the 2-amino-2-imidazoline from its hydrochloride salt by dissolving in a lower alkanol, adding an equivalent amount of the corresponding alkali metal alkoxide (such as sodium methoxide or potassium tert.-butoxide). The alkali metal chloride is removed by filtration and the lower alkanol solution of 2-amino-2-imidazoline can be treated directly with the desired pyrazinonitrile (II), alkyl pyrazinimidate salt (IV) or alkyl pyrazinthioimidate (V).

The alkyl 3-amino-5-X-6-halopyrazinimidate hydrochloride (IV) can be prepared from the corresponding 3-amino-5-X-6-halopyrazinonitrile (II) and an alkanol, such as ethanol, in the presence of hydrogen chloride at ambient temperatures.

The alkyl 3-amino-5-X-6-halopyrazinthioimidates (V) can be prepared from an alkyl mercaptan and the required nitrile (II) in the presence of a basic catalyst such as an alkali metal hydroxide. This reaction can be conducted at ambient or slightly higher temperatures using a solvent such as a lower alkanol.

It has been found that the 3-amino-5-X-6-halopyrazinonitrile intermediates (II) can be prepared by the reactions illustrated graphically below:

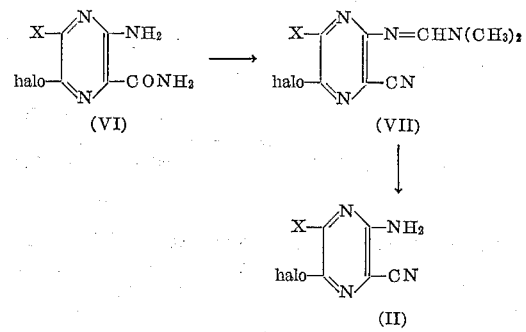

The 3-amino-5-X-6-halopyrazinamide (VI) upon treatment with either phosphoryl chloride or thionyl chloride in the presence of dimethylformamide, advantageously by warming, forms the corresponding N,N-dimethyl-N'-(3-cyano - 5 - halo-6-X-2-pyrazinyl)formamidine (VII), which can be hydrolyzed in the presence of a strong mineral or organic acid (such as hydrochloric, sulfuric, methanesulfonic and the like acids) to produce the desired 3-amino-5-X-6-halopyrazinonitrile (II).

It is to be recognized that if X is amino in the starting amide (VI), in the intermediate (VII) X will be N=CHN(CH$_3$)$_2$ but in the product (II) will be amino since hydrolysis will involve both the 3- and the 5-substituents.

An alternate route to the 3-amino-5-R$^3$R$^4$N-6-halopyrazinonitriles (IIB) involves the reaction of one of the nitrile compounds (II), namely a 3 amino-5-chloro(or bromo)-6-halopyrazinonitrile (IIA), with ammonia, a primary amine or a secondary amine.

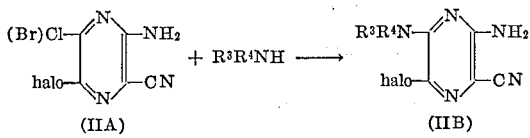

The reaction is advantageously conducted in a polar solvent, such as dimethylformamide, dimethyl sulfoxide, sulfolane and the like. The reaction can be carried out at ambient temperature; however, it is advantageous to conduct the reaction at higher temperatures such as 50° C. to 120° C. for a period of from 10 minutes to 6 hours.

This method has the advantage that the R$^3$R$^4$ substituents cannot only be the same as the R$^1$ and R$^2$ groups described supra but also can be hydroxyalkyl, polyhydroxyalkyl and amino.

The 3-amino-5-X$^1$-6-halopyrazinamide (VIA) intermediates (where X$^1$ represents each of the X groups described supra except lower alkoxy and lower-alkylmercapto) advantageously are prepared by the reaction of the appropriate alkyl 3-amino-5-X$^1$-6-halopyrazinoate (VIII) with ammonia.

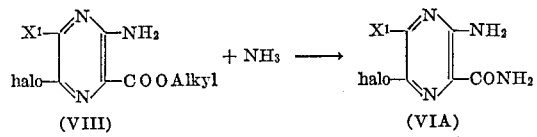

The reaction can be conducted using liquid ammonia at temperatures slightly below ambient temperature to slightly above ambient temperature. Alternatively, the ester can be dissolved in an inert solvent and ammonia gas admitted below the surface of the solution. With esters which have a 5-chloro or bromo substituent, lower temperatures and the use of liquid ammonia and a non-polar solvent favor the formation of the desired amide (VIA) while higher temperatures and polar solvents favor the formation of 3,5-diamino-6-halo-pyrazinamide.

The 3-amino-5-X″-6-halopyrazinamide (VIB) intermediates (where X″ represents lower alkoxy, lower alkylthio and R$^1$R$^2$N—) can be prepared by the reaction of a 3-amino-5-chloro(or bromo)-6-halopyrazinamide (VIC) with an appropriate reagent (IX)

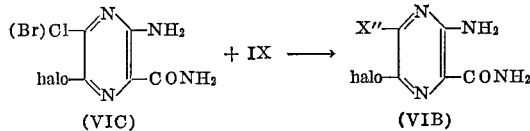

When the reagent (IX) is a lower alkanol (ROH) or lower alkyl mercaptan (RSH), and a base, such as triethylamine or pyridine in a solvent as dimethylformamide or dimethyl sulfoxide, is used, the product is a 3-amino-5-lower alkoxy-(or lower alkylthio)-6-halopyrazinamide. The reaction also can be carried out using ROM or RSM where M is derived from an alkali metal. When ROM is used ROH can be used as a solvent. When IX is R$^1$R$^2$NH in a solvent such as dimethyl sulfoxide or dimethyl formamide the product is a 3-amino-5-R$^1$R$^2$N-6-halopyrazinamide. It is usually advantageous to conduct these reactions above ambient temperature, such as at 50° C. to the reflux temperature of the solvent.

The novel products of this invention possess diuretic and saluretic properties, which properties are useful in the treatment of edema or other conditions associated with an abnormal retention of fluid and/or electrolytes especially sodium and chloride ions. The products can be administered either orally or parenterally and can therefore be administered in any of the usual suitable dosage forms such as admixed with lactose, encapsulated and administered orally. While the dosage of the selected product will vary depending upon the age and condition of the patient and the particular product used, effective dosages ranging between about 50 mg. to 1 g. per dose administered 1 to 4 times daily generally will produce the desired effect.

The novel products and the novel methods for preparing them will be described in greater detail in the following examples which are illustrative but not limitative of the invention:

EXAMPLE 1.—2-(3-AMINO-6-CHLOROPYRAZIN-AMIDINO)-2-IMIDAZOLINE

Step A.—Preparation of 3-amino-6-chloropyrazinamide

Methyl 3-amino-6-chloropyrazinoate (300 g., 1.6 moles) is added to concentrated ammonium hydroxide solution (2 liters) and the mixture allowed to stir 16 hours at room temperature. The solid is collected on a filter and dried yielding 260 g. (94%) of 3-amino-6-chloropyrazinamide, M.P. 227–230° C. Recrystallization from methanol gives material melting at 231–232° C.

Analysis.—Calculated for C$_5$H$_5$ClN$_4$O: C, 34.80; H, 2.92; N, 32.47; Cl, 20.55. Found: C, 35.08; H, 3.18; N, 32.55; Cl, 20.41.

Step B.—Preparation of N,N-dimethyl-N'-(3-cyano-5-chloro-2-pyrazinyl)formamidine 3-amino-6-chloropyrazinamide (2.0 g., 0.0116 mole) is dissolved in dimethylformamide (20 ml.) and phosphoryl chloride (2.0 ml., 0.0113 mole) is added with vigorous stirring. The reaction mixture is heated on a steam bath for 10 minutes and then the solvent is removed by distillation at reduced pressure. The resulting dark oil is dissolved in water (75 ml.), filtered and the filtrate made alkaline to litmus paper with ammonium hydroxide. The solid which separates is removed by filtration yielding 1.5 g. (62%) of N,N-dimethyl-N'-(3-cyano-5-chloro-2-pyrazinyl) formamidine, M.P. 105–110° C. After recrystallization from cyclohexane the compound melts at 114–116° C.

Analysis.—Calculated for C$_8$H$_8$ClN$_5$: C, 45.83; H, 3.84; N, 33.41. Found: C, 45.84; H, 3.65; N, 33.49.

Step C.—Preparation of 3-amino-6-chloropyrazinonitrile

N,N-dimethyl-N'-(3-cyano-5-chloro-2-pyrazinyl)formamidine (4.0 g., 0.019 mole) is dissolved in 2.5% hydrochloric acid (100 ml.) and heated on a steam bath for 15 minutes. After cooling, the solid is separated by filtration yielding 2.8 g. (95%) of 3-amino-6-chloropyrazinonitrile, M.P. 150.5–153.5° C. After recrystallization from cyclohexane the compound melts at 151.5–153.5° C.

Analysis.—Calculated for C$_5$H$_3$ClN$_4$: C, 38.86; H, 1.96; N, 36.25. Found: C, 39.33; H, 2.24; N, 36.73.

Step D.—Preparation of methyl 3-amino-6-chloropyrazinthioimidate 3-amino-6-chloropyrazinonitrile (5.0 g., 0.0323 mole) is dissolved in warm absolute ethanol (100 ml.) and gaseous methyl mercaptan (2.5 g., 0.052 mole) is admitted via a glass tube below the surface of the solution. A 5% sodium hydroxide solution (2 drops) is added to the mixture and a yellow solid begins to separate. After stirring for 15 minutes, water (100 ml.) is added and the solid material is removed by filtration yielding 6.2 g. (95%) of methyl 3-amino-6-chloropyrazinthioimidate, M.P. 193° C. (dec.). After two recrystallizations from ethanol the product melts at 192–194° C.

*Analysis.*—Calculated for $C_6H_7ClN_4S$: C, 35.56; H, 3.48; N, 27.64. Found: C, 35.77; H, 3.65; N, 27.39.

Ethyl 3-amino-6-chloropyrazinimidate hydrochloride is made by the procedure described in Step D by replacing methyl mercaptan by an excess of hydrogen chloride and omitting the sodium hydroxide.

*Step E.—Preparation of 2-(3-amino-6-chloropyrazinamidino)-2-imidazoline*

Sodium (460 mg., 0.02 g. atom) is dissolved in methanol (50 ml.) and 2-amino-2-imidazoline hydrochloride (2.4 g., 0.02 mole) is added and the mixture refluxed for 30 minutes. After cooling the sodium chloride is removed by filtration and methyl 3-amino-6-chloropyrazinthioimidate (2.0 g., 0.01 mole) is added to the filtrate. The mixture is refluxed for 30 minutes, then cooled and the precipitated material removed by filtration, washed with water and dried yielding 900 mg. (39%) of 2-(3-amino-6-chloropyrazinamidino)-2-imidazoline, M.P. 149.5–150.5° C. The compound is suspended in water, dissolved by the addition of dilute hydrochloric acid, filtered and reprecipitated by the addition of dilute sodium hydroxide. The product is separated by filtration, washed with water and dried, M.P. 149.5–150.5° C.

*Analysis.*—Calculated for $C_8H_{10}ClN_7$: C, 40.08; H, 4.21; N, 40.91. Found: C, 40.06; H, 4.15; N, 40.83.

By substituting the 3-amino-6-chloropyrazinthioimidate used in Step E with ethyl 3-amino-6-chloropyrazinimidate hydrochloride described in Step D (0.005 mole) the same product, 2-(3-amino-6-chloropyrazinamidino)-2-imidazoline, is obtained.

EXAMPLE 2.—2-(3-AMINO - 5,6 - DICHLOROPYRAZINAMIDINO)-2-IMIDAZOLINE

*Step A.—Preparation of 3-amino-5,6-dichloropyrazinamide*

Methyl 3-amino-5,6-dichloropyrazinoate (75 g., 0.338 mole) is pulverized, suspended in liquid ammonia (750 ml.) and the mixture placed in a steel autoclave. The autoclave is sealed and allowed to stand at room temperature for 16 hours. The autoclave then is opened and the ammonia allowed to evaporate. The remaining product is suspended in hot acetonitrile, filtered and the process repeated with hot ethanol. After drying, the product is recrystallized from dimethylformamide yielding 53 g. (75%) of 3-amino-5,6-dichloropyrazinamide, M.P. 290–292° C. (dec.).

*Analysis.*—Calculated for $C_5H_4Cl_2N_4O$: C, 29.07; H, 1.95; N, 27.06. Found: C, 29.58; H, 1.87; N, 27.36.

*Step B.—Preparation of 3-amino-5,6-dichloropyrazinonitrile*

3-amino-5,6-dichloropyrazinamide (22 g., 0.106 mole) is dissolved in dimethylformamide (220 ml.). The suspension is rapidly stirred and phosphoryl chloride (22 ml.) added rapidly. The temperature of the reaction rises to 80° C. and the solid dissolves. The temperature is held at 80° C. for 10 minutes and then cooled and poured with stirring into 500 ml. of cold water. The yellow solid that separates is removed by filtration, washed with water and dried yielding 12.5 g. (48%) of N,N-dimethyl-N'-(3-cyano - 5,6 - dichloro - 2 - pyrazinyl) formamidine, M.P. 116–118° C. The product (12.5 g., 0.05 mole) then is suspended in 1.5% hydrochloric acid (500 ml.) and the mixture is heated with stirring on a steam bath for 1½ hours. After cooling the solid that separates is removed by filtration yielding 9.25 g. (95%) of 3-amino-5,6-dichloropyrazinonitrile, M.P. 213–215° C. Recrystallization from benzene gives material with the same melting point.

*Analysis.*—Calculated for $C_5H_2Cl_2N_4$: C, 31.77; H, 1.06; N, 29.64. Found: C, 31.83; H, 1.34; N, 29.41.

*Step C.—Preparation of 2-(3-amino-5,6-dichloropyrazinamidino)-2-imidazoline*

Sodium (460 mg., 0.02 g. atom) is dissolved in methanol (50 ml.) and 2-amino-2-imidazoline hydrochloride (2.4 g., 0.02 mole) is added. The mixture is refluxed for 30 minutes, then cooled and the precipitated sodium chloride removed by filtration. 3-amino-5,6-dichloropyrazinonitrile (2.0 g., 0.0105 mole) is added to the filtrate and the mixture refluxed for 10 minutes. After cooling, the product that separates is removed by filtration, washed with water and dried yielding 1.3 g. (45%) of 2 - (3-amino-5,6-dichloropyrazinamidino)-2-imidazoline, M.P. >290° C.

*Analysis.*—Calculated for $C_8H_9Cl_2N_7$: C, 35.05; H, 3.31; N, 35.76. Found: C, 35.63; H, 3.37; N, 35.51.

EXAMPLE 3.—2 - (3 - AMINO - 6 - BROMOPYRAZINAMIDINO) - 2 - IMIDAZOLINE

*Step A.—Preparation of 3-amino-6-bromopyrazinonitrile*

3-aminopyrazinonitrile (11.1 g., 0.093 mole) is dissolved in acetic acid (92 ml.) by warming to 60° C. and a solution of bromine (16 g., 0.2 g. atom) in acetic acid (7 ml.) is added. The mixture is stirred for 15 minutes and then cooled and poured into ice water (300 ml.). The solid that separates is removed by filtration, washed with water and dried yielding 15.7 g. (85%) of product, M.P. 170–174° C. After recrystallization from benzene and then ethanol, the 3-amino-6-bromopyrazinonitrile melts at 181–183° C.

*Analysis.*—Calculated for $C_5H_3BrN_4$: C, 30.18; H, 1.52; N, 28.15. Found: C, 30.44; H, 1.69; N, 28.40.

*Step B.—Preparation of 2-(3-amino-6-bromopyrazinamidino)-2-imidazoline*

This product is prepared following substantially the same procedure described in Example 2, Step C, except the 3-amino-5,6-dichloropyrazinonitrile is replaced by an equimolecular quantity of 3-amino-6-bromopyrazinonitrile.

EXAMPLE 4.—2-(3-AMINO-5-METHOXYLAMINO-6-CHLOROPYRAZINAMIDINO)-2-IMIDAZOLINE

*Step A.—Preparation of 3-amino-5-methoxylamino-6-chloropyrazinonitrile*

3-amino-5,6-dichloropyrazinonitrile from Example 2, Step B (0.0625 mole), is dissolved in dimethyl sulfoxide (50 ml.) at 65° C., then methoxylamine (0.13 mole) is added and the solution stirred at this temperature for 15 minutes. After cooling, the reaction mixture is poured into water (150 ml.) and the solid that separates is removed by filtration, washed with water and dried yielding 3-amino-5-methoxylamino-6-chloropyrazinonitrile.

*Step B.—Preparation of 2-(3-amino-5-methoxylamino-6-chloropyrazinamidino)-2-imidazoline*

This product is prepared following substantially the same procedure described in Example 2, Step C, except the 3-amino-5,6-dichloropyrazinonitrile is replaced by an equimolecular quantity of 3-amino-5-methoxylamino-6-chloropyrazinonitrile.

EXAMPLE 5.—2-(3-AMINO-5-CHLORO-6-BROMOPYRAZINAMIDINO)-2-IMIDAZOLINE

*Step A.—Preparation of methyl 3-amino-6-bromopyrazinoate 4-oxide*

A solution of methyl 3-amino-6-bromopyrazinoate (4.6 g., 0.02 mole) and m-chloroperbenzoic acid (3.4 g., 0.02 mole) in chloroform (75 ml.) is refluxed for one hour, then chilled. The solid that separates is recovered by filtration and recrystallized from ethanol to yield 5.0 g. (98%) of methyl 3-amino-6-bromopyrazinoate 4-oxide, M.P. 200–202° C.

Step B.—Preparation of methyl 3-amino-5-chloro-6-bromopyrazinoate

Methyl 3-amino-6-bromopyrazinoate 4-oxide (2.0 g., 0.008 mole) is dissolved in dimethylformamide (20 ml.), phosphoryl chloride (2.0 ml.) is added and the reaction is stirred vigorously for 30 minutes and then poured into water (100 ml.). The clear solution deposits reddish crystals after standing for several hours, which are recrystallized from acetonitrile to yield 1.5 g. (71%) of methyl 3-amino-5-chloro-6-bromopyrazinoate, M.P. 225–228° C.

Step C.—Preparation of 3-amino-5-chloro-6-bromopyrazinonitrile

By replacing the methyl 3-amino-5,6-dichloropyrazinoate employed in Step A of Example 2 by an equimolecular quantity of methyl 3-amino-5-chloro-6-bromopyrazinoate and then following the same procedures and using equivalent quantities of reactants described in Steps A through C of Example 2, there is produced successively 3-amino-5-chloro-6-bromopyrazinamide, N,N-dimethyl-N'-(3-cyano-5-bromo-6-chloro-2-pyrazinyl)formamidine and 3-amino-5-chloro-6-bromopyrazinonitrile.

Step D.—Preparation of 2-(3-amino-5-chloro-6-bromopyrazinamidino)-2-imidazoline This product is prepared following substantially the same procedure described in Example 2, Step C, except the 3-amino-5,6-dichloropyrazinonitrile is replaced by an equimolecular quantity of 3-amino-5-chloro-6-bromopyrazinonitrile.

EXAMPLE 6.—2-(3-AMINO-5,6-DIBROMOPYRAZINAMIDINO)-2-IMIDAZOLINE

Step A.—Preparation of methyl 3-amino-5,6-dibromopyrazinoate

By replacing the phosphoryl chloride used in Step B of Example 5 by an equal quantity of phosphoryl bromide and following substantially the same procedure described in Example 5, Step B, there is obtained methyl 3-amino-5,6-dibromopyrazinoate.

Step B.—Preparation of 3-amino-5,6-dibromopyrazinonitrile

By replacing the methyl 3-amino-5,6-dichloropyrazinoate employed in Example 2, Step A, by an equimolecular quantity of methyl 3-amino-5,6-dibromopyrazinoate and then using the same procedures and using equivalent quantities of the appropriate reagents and reactants described in Example 2, Steps A and B, there is produced successively 3-amino-5,6-dibromopyrazinamide, N,N-dimethyl-N'-(3-cyano-5,6-dibromo-2-pyrazinyl)formamidine and 3-amino-5,6-dibromopyrazinonitrile.

Step C.—Preparation of 2-(3-amino-5,6-dibromopyrazinamidino)-2-imidazoline

This product is prepared following substantially the same procedure described in Example 2, Step C, except the 3-amino-5,6-dichloropyrazinonitrile is replaced by an equimolecular quantity of 3-amino-5,6-dibromopyrazinonitrile.

EXAMPLE 7.—2-(3,5-DIAMINO-6-CHLOROPYRAZINAMIDINO)-2-IMIDAZOLINE

Step A.—Preparation of 3,5-diamino-6-chloropyrazinamide

Methyl 3-amino-5,6-dichloropyrazinoate (22.2 g., 0.1 mole) is added to liquid ammonia (200 ml.) in a stainless steel autoclave and the reaction mixture is heated at 100° C. for 12 hours. The ammonia is expelled and the product is removed from the autoclave and recrystallized from methanol to give 16.8 g. (90%) of 3,5-diamino-6-chloropyrazinamide, M.P. 218.5–220.5° C.

*Analysis.*—Calculated for $C_5H_6ClN_5O$: C, 32.01; H, 3.22; N, 37.33; Cl, 18.90. Found: C, 32.36; H, 3.00; N, 37.50; Cl, 18.84.

Step B.—Preparation of 3,5-diamino-6-chloropyrazinonitrile

To a stirred suspension of 3,5-diamino-6-chloropyrazinamide (2.0 g., 0.0115 moles) in dimethylformamide (20 ml.) is added phosphoryl chloride (2.0 ml. excess) in one portion. The reaction temperature rises to 80° C. and is maintained at this temperature for 10 minutes by application of external heat. The solvent then is removed in vacuo and the residue is added to boiling water (50 ml.). In a few minutes a yellow crystalline solid separates, the solution is cooled, and the product recovered by filtration to yield 1.5 g. (77%), M.P. 290–295° C. After recrystallization from water, 3,5-diamino-6-chloropyrazinonitrile melts at 295° C.

*Analysis.*—Calculated for $C_5H_4N_5Cl$: C, 35.41; H, 2.48; N, 41.30. Found: C, 35.69; H, 2.30; N, 41.10.

Step C.—Preparation of 2-(3,5-diamino-6-chloropyrazinamidino)-2-imidazoline This product is prepared following substantially the same procedure described in Example 2, Step C, except the 3-amino-5,6-dichloropyrazinonitrile is replaced by an equimolecular quantity of 3,5-diamino-6-chloropyrazinonitrile.

EXAMPLE 8.—2-(3 - AMINO-5-ISOPROPYLAMINO-6-CHLOROPYRAZINAMIDINO) - 2 - IMIDAZOLINE

Step A.—Preparation of 3-amino-5-isopropylamino-6-chloropyrazinamide

To a solution of 3-amino - 5,6 - dichloropyrazinamide (12.4 g., 0.06 mole) in dimethylsulfoxide (160 ml.) is added isopropylamine (7.10 g., 0.12 mole) and the reaction mixture is heated at 65° C. for 30 minutes. The mixture is then poured into water (300 ml.) and the precipitated product recovered by filtration and dried to yield 8.2 g. (60%), M.P. 137–139° C. After recrystallization from isopropyl alcohol, 3 - amino-5-isopropylamino-6-chloropyrazinamide melts at 140–141° C.

*Analysis.*—Calculated for $C_8H_{12}N_5OCl$: C, 41.85; H, 5.26; N, 30.50. Found: C, 41.55; H, 5.25; N, 30.56.

Step B.—Preparation of N,N-dimethyl - N' - (3 - cyano-5-chloro-6-isopropylamino-2-pyrazinyl)formamidine To a stirred suspension of 3-amino-5-isopropylamino-6-chloropyrazinamide (7.2 g., 0.0315 mole) in dimethylformamide (70 ml.) is added in one portion phosphoryl chloride (7.0 ml.). The temperature rises to 65° C. and it is maintained at that temperature for 15 minutes by the application of heat. The reaction mixture then is poured into water (140 ml.) and the solution is neutralized with ammonium hydroxide, whereby the product separates yielding 4.5 g. (54%) of N,N-dimethyl-N'-(3-cyano-5-chloro-6-isopropylamino-2-pyrazinyl)formamidine, M.P. 144–145° C. After crystallization from isopropyl alcohol, the melting point remains at 144–145° C.

*Analysis.*—Calculated for $C_{11}H_{15}N_6Cl$: C, 49.55; H, 5.68. Found: C, 49.39; H, 5.60.

Step C.—Preparation of 3-amino-5-isopropylamino-6-chloropyrazinonitrile

A solution of N,N-dimethyl-N'-(3-cyano-5-chloro-6-isopropylamino-2-pyrazinyl)formamidine (2.6 g., 0.01 mole) in 2% hydrochloric acid (50 ml.) is heated on the steam bath for 30 minutes during which time the product begins to precipitate. The reaction mixture is chilled and the product recovered by filtration to yield 1.26 g. (60%) of 3-amino-5-isopropylamino-6-chloropyrazinonitrile, M.P. 124–127° C. After crystallization from methylcyclohexane, the product melts at 126–128° C.

*Analysis.*—Calculated for $C_8H_{10}N_5Cl$: C, 45.45; H, 4.76; N, 33.12. Found: C, 44.81; H, 4.59; N, 33.35.

Step D.—Preparation of 2-(3-amino-5-isopropylamino-6-chloropyrazinamidino)-2-imidazoline This product is prepared following substantilly the same procedure described in Example 2, Step C, except the 3-amino-5,6-dichloropyrazinonitrile is replaced by an equimolecular quantity of 3-amino-5-isopropylamino-6-chloropyrazinonitrile.

EXAMPLE 9.—2-(3-AMINO-5-DIMETHYLAMINO-6-CHLOROPYRAZINAMIDINO)-2-IMIDAZOLINE

Step A.—Preparation of 3-amino-5-dimethylamino-6-chloropyrazinamide

To a stirred solution of 3-amino-5,6-dichloropyrazinamide (10.0 g., 0.05 mole) in dimethyl sulfoxide (150 ml.) is added dimethylamine (20 ml. of a 25% aqueous solution) and the reaction mixture is heated on the steam bath for 30 minutes. When the reaction mixture is poured into water (200 ml.) and chilled, the product separates yielding 9.0 g. (86%) of 3-amino-5-dimethylamino-6-chloropyrazinamide, M.P. 181–183° C. After recrystallization of the product from ethanol, melting point of the product remains unchanged.

Analysis.—Calculated for $C_7H_{10}N_5OCl$: C, 39.04; H, 4.68; N, 32.54. Found: C, 39.04; H, 4.55; N, 32.45.

Step B.—Preparation of 3-amino-5-dimethylamino-6-chloropyrazinonitrile

To a solution of 3-amino-5-dimethylamino-6-chloropyrazinamide (8.0 g., 0.037 mole) in dimethylformamide (80 ml.) is added phosphoryl chloride (8.0 ml.). The temperature of the reaction rises to 80° C. and is maintained at that temperature for 10 minutes by application of heat. The reaction mixture then is poured into water (200 ml.) and the resulting solution made slightly basic with ammonium hydroxide which causes the precipitation of a yellow solid. The solid is recovered by filtration, dissolved in 2% hydrochloric acid (100 ml.), and the solution is heated on the steam bath for 15 minutes. The product which separates is recovered from the chilled reaction mixture by filtration yielding 4.0 g. (55%) of 3-amino-5-dimethylamino-6-chloropyrazinonitrile, M.P. 120–122° C.

Analysis.—Calculated for $C_7H_8N_5Cl$: C, 42.55; H, 4.14; N, 35.45. Found: C, 42.68; H, 4.10; N, 35.62.

Step C.—Preparation of 2-(3-amino-5-dimethylamino-6-chloropyrazinamidino)-2-imidazoline This product is prepared following substantially the same procedure described in Example 2, Step C, except the 3-amino-5,6-dichloropyrazinonitrile is replaced by an equimolecular quantity of 3-amino-5-dimethylamino-6-chloropyrazinonitrile.

EXAMPLE 10.—2-(3-AMINO-5-ALLYLAMINO-6-CHLOROPYRAZINAMIDINO)-2-IMIDAZOLINE

Step A.—Preparation of 3-amino-5-allylamino-6-chloropyrazinonitrile

A solution of 3-amino-5,6-dichloropyrazinonitrile (10 g., 0.053 mole) in dimethyl sulfoxide (70 ml.) is heated to 60° C. and treated with allylamine (3.5 g., 0.061 mole). The mixture is stirred for 20 minutes without application of heat, then cooled and poured into cold water (200 ml.). The solid that separates is removed by filtration, washed with water and dried yielding 4.5 g. of 3-amino-5-allylamino-6-chloropyrazinonitrile which, after recrystallization from butyl chloride, melts at 103–105° C.

Analysis.—Calculated for $C_8H_8ClN_5$: C, 45.79; H, 3.85; N, 33.42. Found: C, 46.01; H, 3.89; N, 33.56.

Step B.—Preparation of 2-(3-amino-5-allylamino-6-chloropyrazinamidino)-2-imidazoline This product is prepared following substantially the same procedure described in Example 2, Step C, except the 3-amino-5,6-dichloropyrazinonitrile is replaced by an equimolecular quantity of 3-amino-5-allylamino-6-chloropyrazinonitrile.

EXAMPLE 11.—2-(3-AMINO-5-ETHYLAMINO-6-CHLOROPYRAZINAMIDINO)-2-IMIDAZOLINE

Step A.—Preparation of 3-amino-5-ethylamino-6-chloropyrazinonitrile 3-amino-5,6-dichloropyrazinonitrile from Example 2 (5.0 g., 0.0265 mole) is dissolved in dimethyl sulfoxide (50 ml.) at 65° C., then 70% aqueous ethylamine (3.5 ml., 0.05 mole) is added and the solution stirred at this temperature for 15 minutes. After cooling the reaction mixture is poured into water (150 ml.) and the solid that separates is removed by filtration, washed with water and dried yielding 3.2 g. (62%) of product, M.P. 100–105° C. After recrystallization from isopropyl alcohol, the 3-amino - 5 - ethylamino - 6 - chloropyrazinonitrile melts at 107–109° C.

Analysis.—Calculated for $C_7H_8ClN_5$: C, 42.55; H, 4.14; N, 35.45. Found: C, 42.21; H, 3.92; N, 35.34.

Step B.—Preparation of 2-(3-amino-5-ethylamino-6-chloropyrazinamidino)-2-imidazoline This product is prepared following substantially the same procedure described in Example 2, Step C, except the 3-amino-5,6-dichloropyrazinonitrile is replaced by an equimolecular quantity of 3-amino-5-ethylamino-6-chloropyrazinonitrile.

EXAMPLE 12.—2-(3-AMINO-5-DIETHYLAMINO-6-CHLOROPYRAZINAMIDINO)-2-IMIDAZOLINE

Step A.—Preparation of 3-amino-5-diethylamino-6-chloropyrazinonitrile

To a suspension of 3-amino-5,6-dichloropyrazinonitrile (8.0 g., 0.042 mole) in boiling ethanol (80 ml.) is added diethylamine (6.2 g., 0.085 mole). After refluxing for 18 hours the reaction mixture is cooled and poured into water (160 ml.). The solid that separates is removed by filtration, washed with water and dried yielding 6.6 g. (70%) of 3-amino-5-diethylamino-6-chloropyrazinonitrile, M.P. 114–115° C. After recrystallization from methylcyclohexane, the melting point is 114–116° C.

Analysis.—Calculated for $C_9H_{12}ClN_5$: C, 47.90; H, 5.36; N, 31.05. Found: C, 47.98; H, 5.36; N, 31.24.

Step B.—Preparation of 2-(3-amino-5-diethylamino-6-chloropyrazinamidino)-2-imidazoline This product is prepared following substantially the same procedure described in Example 2, Step C, except the 3-amino-5,6-dichloropyrazinonitrile is replaced by an equimolecular quantity of 3-amino-5-diethylamino-6-chloropyrazinonitrile.

EXAMPLE 13.—2-(3 - AMINO - 5 - METHOXY-6-CHLOROPYRAZINAMIDINO)-2-IMIDAZOLINE

Step A.—Preparation of 3-amino-5-methoxy-6-chloropyrazinamide

Sodium (2.3 g., 0.1 mole) is dissolved in methanol (100 ml.) and the solution evaporated to dryness at reduced pressure. The solid sodium methoxide is dissolved in dimethylformamide and the 3-amino-5,6-dichloropyrazinamide (20.7 g., 0.1 mole) (from Example 2, Step A) added and the mixture stirred and heated on a steam bath for 30 minutes. The solvent is removed by distillation at reduced pressure and the residue suspended in water, filtered, washed with water and recrystallized from isopropyl alcohol.

Step B.—Preparation of 3-amino-5-methoxy-6-chloropyrazinonitrile

This compound is prepared as described in Example 2, Step B, except that an equivalent quantity of 3-amino-5-methoxy-6-chloropyrazinamide is substituted for 3-amino-5,6-dichloropyrazinamide, thus preparing successively N,N - dimethyl - N' - (3 - cyano-5-chloro-6-methoxy-2-pyrazinyl)formamidine and 3-amino-5-methoxy-6-chloropyrazinonitrile.

*Step C.—Preparation of 2-(3-amino-5-methoxy-6-chloropyrazinamidino)-2-imidazoline*

This product is prepared following substantially the same procedure described in Example 2, Step C, except the 3-amino-5,6-dichloropyrazinonitrile is replaced by an equimolecular quantity of 3-amino-5-methoxy-6-chloropyrazinonitrile.

EXAMPLE 14.—2-(3-AMINO - 5 - METHYLTHIO-6-CHLOROPYRAZINAMIDINO)-2-IMIDAZOLINE

*Step A.—Preparation of 3-amino-5-methylthio-6-chloropyrazinonitrile*

This compound is prepared as described in Example 13, Steps A and B, except that an equivalent quantity of the sodium salt of methyl mercaptan is substituted for sodium methoxide in Step A. Thus, the products obtained in order are 3-amino-5-methylthio-6-chloropyrazinamide, N,N - dimethyl - N' - (3-cyano-5-chloro-6-methylthio-2-pyrazinyl)formamidine and 3-amino - 5 - methylthio-6-chloropyrazinonitrile.

*Step B.—Preparation of 2-(3-amino-5-methylthio-6-chloropyrazinamidino)-2-imidazoline*

This product is prepared following substantially the same procedure described in Example 2, Step C, except the 3-amino-5,6-dichloropyrazinonitrile is replaced by an equimolecular quantity of 3 - amino - 5 - methylthio-6-chloropyrazinonitrile.

EXAMPLE 15.—2-(3-AMINO-5-ETHYLTHIO-6-BROMOPYRAZINAMIDINO)-2-IMIDAZOLINE

*Step A.—Preparation of 3-amino-5-ethylthio-6-bromopyrazinonitrile*

This compound is prepared as described in Example 13, Steps A and B, except that an equivalent quantity of the sodium salt of ethyl mercaptan is substituted for the sodium methoxide and an equivalent quantity of 3-amino-5-chloro-6-bromopyrazinamide (from Example 5, Step C, part 1) is substituted for 3-amino-5,6-dichloropyrazinamide in Step A. Thus, the products obtained in order are 3-amino-5-ethylthio-6-bromopyrazinamide, N,N-dimethyl-N'-(3 - cyano - 5 - bromo-6-ethylthio-2-pyrazinyl)-formamidine, and 3-amino-5-ethylthio-6-bromopyrazinonitrile.

*Step B.—Preparation of 2-(3-amino-5-ethylthio-6-bromopyrazinamidino)-2-imidazoline*

This product is prepared following substantially the same procedure described in Example 2, Step C, except the 3-amino-5,6-dichloropyrazinonitrile is replaced by an equimolecular quantity of 3-amino-5-ethylthio-6-bromopyrazinonitrile.

EXAMPLE 16.—2-(3,5-DIAMINO-6-BROMOPYRAZINAMIDINO)-2-IMIDAZOLINE

*Step A.—Preparation of 3,5-diamino-6-bromopyrazinonitrile*

This product is prepared following the procedure described in Example 7, Steps A and B, except that in Step A methyl 3-amino-5-chloro-6-bromopyrazinoate (from Example 5, Step B) is substituted for methyl 3-amino-5,6-dichloropyrazinoate, and the 3,5-diamino-6-bromopyrazinamide thus prepared is substituted for the 3,5-diamino-6-chloropyrazinamide used in Step B.

*Step B.—Preparation of 2-(3,5-diamino-6-bromopyrazinamidino)-2-imidazoline*

This product is prepared following substantially the same procedure described in Example 2, Step C, except the 3-amino-5,6-dichloropyrazinonitrile is replaced by an equimolecular quantity of 3,5-diamino-6-bromopyrazinonitrile.

EXAMPLE 17.—2-[3-AMINO-5-(2 - HYDROXYETHYLAMINO) - 6 - CHLOROPYRAZINAMIDINO] - 2-IMIDAZOLINE

*Step A.—Preparation of 3-amino-5-(2-hydroxyethylamino)-6-chloropyrazinonitrile*

By replacing the allylamine used in Example 10 with an equivalent amount of 2-hydroxyethylamine and stirring the reaction mixture for 24 hours instead of 20 minutes and otherwise conducting the reaction as in Example 10 there is obtained 3-amino-5-(2-hydroxyethylamino)-6-chloropyrazinonitrile.

*Step B.—Preparation of 2-[3-amino-5-(2-hydroxyethylamino)-6-chloropyrazinamidino]-2-imidazoline*

This product is prepared following substantially the same procedure described in Example 2, Step C, except the 3-amino-5,6-dichloropyrazinonitrile is replaced by an equimolecular quantity of 3-amino-5-(2-hydroxyethylamino)-6-chloropyrazinonitrile.

EXAMPLE 18.—2-(3-AMINO-5-FURFURYLAMINO-6-CHLOROPYRAZINAMIDINO)-2-IMIDAZOLINE

*Step A.—Preparation of 3-amino-5-furfurylamino-6-chloropyrazinonitrile*

By replacing the allylamine used in Example 10 with an equivalent amount of furfurylamine and conducting the reaction as described in Example 10 there is obtained 3-amino-5-furfurylamino-6-chloropyrazinonitrile.

*Step B.—Preparation of 2-(3-amino-5-furfurylamino-6-chloropyrazinamidino)-2-imidazoline*

This product is prepared following substantially the same procedure described in Example 2, Step C, except the 3-amino-5,6-dichloropyrazinonitrile is replaced by an equimolecular quantity of 3-amino-5-furfurylamino-6-chloropyrazinonitrile.

EXAMPLE 19.—2-(3-AMINO-5-ANILINO-6-CHLOROPYRAZINAMIDINO)-2-IMIDAZOLINE

*Step A.—Preparation of 3-amino-5-anilino-6-chloropyrazinonitrile*

A solution of 3-amino-5,6-dichloropyrazinonitrile (10 g., 0.053 mole), aniline (14.9 g., 0.16 mole) and aniline hydrochloride (13.7 g., 0.116 mole) and dimethyl sulfoxide (100 ml.) is heated at 65° C. for 3 hours and then cooled and diluted with water (100 ml.). The solid that separates is removed by filtration, washed with water, dried and washed with methylcyclohexane. After recrystallization from isopropyl alcohol there is obtained 3-amino-5-anilino-6-chloropyrazinonitrile.

*Step B.—Preparation of 2-(3-amino-5-anilino-6-chloropyrazinamidino)-2-imidazoline*

This product is prepared following substantially the same procedure described in Example 2, Step C, except the 3-amino-5,6-dichloropyrazinonitrile is replaced by an equimolecular quantity of 3-amino-5-anilino-6-chloropyrazinonitrile.

EXAMPLE 20.—2-(3-AMINO-5-PHENYL-6-BROMOPYRAZINAMIDINO)-2-IMIDAZOLINE

*Step A.—Preparation of 3-amino-5-phenyl-6-bromopyrazinonitrile*

This product is prepared following the procedure of Example 1, Steps A through C, except methyl 3-amino-6-chloropyrazinoate employed in Step A of Example 1 is replaced by an equimolecular quantity of methyl 3-amino-5-phenyl-6-bromopyrazinoate. By following the procedures of Steps A through C of Example 1, there is produced successively 3-amino-5-phenyl-6-bromopyrazinamide, N,N-dimethyl-N'-(3cyano5-bromo-6-phenyl-2-pyrazinyl)formamidine and 3-amino-5-phenyl-6-bromopyrazinonitrile.

*Step B.—Preparation of 2-(3-amino-5-phenyl-6-bromopyrazinamidino)-2-imidazoline*

This product is prepared following substantially the same procedure described in Example 2, Step C, except the 3-amino-5,6-dichloropyrazinonitrile is replaced by an equimolecular quantity of 3-amino-5-phenyl-6-bromopyrazinonitrile.

EXAMPLES 21–23

Similarly, by replacing methyl 3-amino-6-chloropyrazinoate in Example 1, Step A, by an equivalent quantity of:

methyl 3-amino-5-p-tolyl-6-chloropyrazinoate (Ex. 21),
methyl 3-amino-5-p-chlorophenyl-6-chloropyrazinoate (Ex. 22), and
methyl 3-amino-5-methyl-6-bromopyrazinoate (Ex. 23), and following substantially the same procedure described in Steps A through C of Example 1 there is produced:

Ex. 21, 3-amino-5-p-tolyl-6-chloropyrazinonitrile,
Ex. 22, 3-amino-5-p-chlorophenyl-6-chloropyrazinonitrile, and
Ex. 23, 3-amino-5-methyl-6-bromopyrazinonitrile.

By replacing the 3-amino-5,6-dichloropyrazinonitrile used in Step C of Example 2 by the nitriles of Examples 21, 22 and 23 successively, there is produced:

Ex. 21, 2-(3-amino-5-p-tolyl-6-chloropyrazinamidino)-2-imidazoline,
Ex. 22, 2-(3-amino-5-p-chlorophenyl-6-chloropyrazinamidino)-2-imidazoline and
Ex. 23, 2-(3-amino-5-methyl-6-bromopyrazinamidino)-2-imidazoline.

EXAMPLE 24.—2-(3-AMINO-5-BENZYLOXY-6-CHLOROPYRAZINAMIDINO)-2-IMIDAZOLINE

*Step A.—Preparation of 3-amino-5-benzyloxy-6-chloropyrazinonitrile*

This product is prepared by the process described in Example 13, Steps A and B, except the methanol used in Step A is replaced by benzyl alcohol.

*Step B.—Preparation of 2-(3-amino-5-benzyloxy-6-chloropyrazinamidino)-2-imidazoline*

This product is prepared following substantially the same procedure described in Example 2, Step C, except the 3-amino-5,6-dichloropyrazinonitrile is replaced by an equimolecular quantity of 3-amino-5-benzyloxy-6-chloropyrazinonitrile.

EXAMPLE 25.—2-(3-AMINO-5-BENZYLTHIO-6-CHLOROPYRAZINAMIDINO)-2-IMIDAZOLINE

*Step A.—Preparation of 3-amino-5-benzylthio-6-chloropyrazinonitrile*

This product is prepared by the process described in Example 13, Steps A and B, except that the sodium methoxide used in Step A is replaced by the sodium salt of benzyl mercaptan.

*Step B.—Preparation of 2-(3-amino-5-benzylthio-6-chloropyrazinamidino)-2-imidazoline*

This product is prepared following substantially the same procedure described in Example 2, Step C, except the 3-amino-5,6-dichloropyrazinonitrile is replaced by an equimolecular quantity of 3-amino-5-benzylthio-6-chloropyrazinonitrile.

EXAMPLE 26.—2-(3-AMINO-5-p-METHYLANILINO-6-CHLOROPYRAZINAMIDINO)-2-IMIDAZOLINE

*Step A.—Preparation of 3-amino-5-p-methylanilino-6-chloropyrazinonitrile*

This product is prepared by the process described in Example 19, Step A, except the aniline and the aniline hydrochloride employed there are replaced by equimolecular quantities of p-toluidine and p-toluidine hydrochloride respectively.

*Step B.—Preparation of 2-(3-amino-5-p-methylanilino-6-chloropyrazinamidino)-2-imidazoline*

This product is prepared following substantially the same procedure described in Example 2, Step C, except the 3-amino-5,6-dichloropyrazinonitrile is replaced by an equimolecular quantity of 3-amino-5-p-methylanilino-6-chloropyrazinonitrile.

EXAMPLE 27.—2-(3-AMINO-5-p-CHLOROANILINO-6-CHLOROPYRAZINAMIDINO)-2-IMIDAZOLINE

*Step A.—Preparation of 3-amino-5-p-chloroanilino-6-chloropyrazinonitrile*

This product is prepared by the process described in Example 19, Step A, except the aniline and the aniline hydrochloride employed there are replaced by equimolecular quantities of p-chloroaniline and p-chloroaniline hydrochloride respectively.

*Step B.—Preparation of 2-(3-amino-5-p-chloroanilino-6-chloropyrazinamidino)-2-imidazoline*

This product is prepared following substantially the same procedure described in Example 2, Step C, except the 3-amino-5,6-dichloropyrazinonitrile is replaced by an equimolecular quantity of 3-amino-5-p-chloroanilino-6-chloropyrazinonitrile.

Other 2-(3-amino-5-X-6-halopyrazinamidino)-2-imidazoline compounds that are prepared by the procedures described in Example 8, Steps A through D, are identified in the following table. In each example the pyrazinamide of the formula

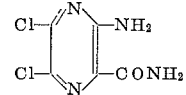

is treated with an amine of the formula $R^1R^2NH$ according to the process described in Step A of Example 8 to give the 3-amino-5-$R^1R^2N$-6-chloropyrazinamide which then is converted to N,N-dimethyl-N'-(3-cyano-5-chloro-6-$R^1R^2N$-2-pyrazinyl)formamidine by the process described in Step B of Example 8. This product then is hydrolyzed to the desired 3-amino-5-$R^1R^2N$-6-chloropyrazinonitrile by the method described in Step C of Example 8, and then reacted with 2-amino-2-imidazoline hydrochloride as specifically described in Step C of Example 2 to give the desired 2-(3-amino-5-$R^1R^2N$-6-chloropyrazinamidino)-2-imidazoline. The variable group $R^1R^2N$— of the amine reactant and in the subsequent products formed remain unchanged by the reaction and are identified in the appropriate columns of the table. The following table identifies other 2-(3-amino-5-$R^1R^2N$-6-chloropyrazinamidino)-2-imidazolines that are representative of the products that are prepared by substituting equivalent quantities of known amines of the formula $R^1R^2NH$ for the isopropylamine used in Example 8.

TABLE

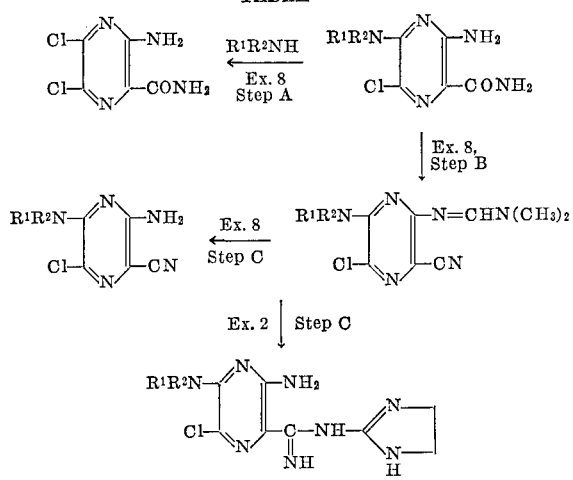

| Ex. No. | R¹ | R² |
|---|---|---|
| 28 | p-Benzyl | H |
| 29 | p-Methylbenzyl | H |
| 30 | p-Chlorobenzyl | H |
| 31 | 2,2,2-trifluoroethyl | H |
| 32 | Cyclopropylmethyl | H |
| 33 | Cyclopentyl | H |
| 34 | 4-pyridylmethyl | H |
| 35 | 2-dimethylaminoethyl | H |
| 36 | Methyl | Allyl |
| 37 | Propyl | Butyl |
| 38 |  | Tetramethylene |
| 39 |  | Hexamethylene |

While the invention has been described by certain specific reactants and certain specific reaction conditions to produce specific novel products, it is to be understood that the invention is not limited by the examples but embraces the variations hereinbefore described and hereinafter claimed.

What is claimed is:

1. The method comprising the reaction of a product selected from 3-amino-5-X-6-halopyrazinonitrile, an alkyl 3-amino-5-X-6-halopyrazinthioimidate and an alkyl 3-amino-5-X-6-halopyrazinimidate hydrochloride with 2-amino-2-imidazoline to form 2-(3-amino-5-X-6-halopyrazinamidino)-2-imidazoline in a lower alkanol with moderate heating wherein in each of the foregoing products X is selected from the group consisting of hydrogen, chloro, bromo, lower-alkyl, phenyl-lower alkyl, lower alkoxy, phenyl-lower alkoxy, lower alkylthio, phenyl-lower alkylthio, phenyl, lower alkylphenyl, halophenyl, and an amino having the structure $R^1R^2N$— wherein $R^1$ and $R^2$ separately is selected from the group consisting of hydrogen, lower alkoxy, phenyl, lower alkylphenyl, halophenyl, lower alkyl, hydroxy lower alkyl, halo lower alkyl, lower(cycloalkylalkyl) where the cycloalkyl moiety has from 3 to 6 nuclear carbon atoms, lower(alkylaminoalkyl), phenyl lower alkyl, lower(alkoxyalkyl), halophenyl lower alkyl, pyridyl lower alkyl, furyl lower alkyl, and lower alkenyl, lower alicyclic having from 3 to 6 nuclear carbons, and together with the nitrogen atom form

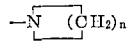

wherein $n$ is an integer from 4 through 6; and wherein the 6-position halo substituent is selected from chloro and bromo.

2. The process wherein 3-amino-5,6-dichloropyrazinonitrile is reacted with 2-amino-2-imidazoline in the presence of a lower alkanol to form 2-(3-amino-5,6-dichloropyrazinamidino)-2-imidazoline.

3. The process wherein 3,5-diamino-6-chloropyrazinonitrile is reacted with 2-amino-2-imidazoline to form 2-(3,5-diamino-6-chloropyrazinamidino)-2-imidazoline.

4. 2 - (3-amino-5-X-6-halopyrazinamidino)-2-imidazoline wherein X is selected from the group consisting of hydrogen, chloro, bromo, lower-alkyl, phenyl-lower alkyl, lower alkoxy, phenyl-lower alkoxy, lower alkylthio, phenyl-lower alkylthio, phenyl, lower alkylphenyl, halophenyl and an amino having the structure $R^1R^2N$— wherein $R^1$ and $R^2$ separately is selected from the group consisting of hydrogen, lower alkoxy, phenyl, lower alkylphenyl, halophenyl, lower alkyl, hydroxy lower alkyl, halo lower alkyl, lower(cycloalkylalkyl), wherein the cycloalkyl moiety has from 3 to 6 nuclear carbons, lower(alkylaminoalkyl), phenyl lower alkyl, lower(alkoxyalkyl), halophenyl lower alkyl, pyridyl lower alkyl, furyl lower alkyl, lower alkenyl, lower alicyclic having 3 to 6 nuclear carbons, and together with the nitrogen atom form

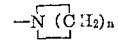

wherein $n$ is an integer from 4 through 6; and wherein the 6-position halo substituent is selected from chloro and bromo.

5. 2 - (3 - amino - 5,6 - dichloropyrazinamidino)-2-imidazoline.

6. 2 - (3,5 - diamino - 6 - chloropyrazinamidino)-2-imidazoline.

7. 2 - (3 - amino-5-di-lower-alkylamino-6-chloro-pyrazinamidino)-2-imidazoline.

8. 2 - [3 - amino - 5 - (hydroxy - lower-alkylamino)-6-chloropyrazinamidino]-2-imidazoline.

9. 2 - (3 - amino - 5-lower-alkylamino-6-chloropyrazinamidino)-2-imidazoline.

10. 2 - [3 - amino - 5 - N - lower-alkyl-N-lower-alkenylamino-6-chloropyrazinamidino]-2-imidazoline.

References Cited by the Examiner

Wertheim: Textbook of Organic Chemistry, pp. 763-764 (1945).

NICHOLAS S. RIZZO, *Primary Examiner.*